US010382918B2

(12) United States Patent
Mattsson et al.

(10) Patent No.: US 10,382,918 B2
(45) Date of Patent: Aug. 13, 2019

(54) SYSTEM AND METHODS FOR MONITORING EVENTS ASSOCIATED WITH SERVICES OF MOBILE DEVICES

(71) Applicant: TELEFONAKTIEBOLAGET LM ERICSSON (PUBL), Stockholm (SE)

(72) Inventors: Ulf Mattsson, Kungsbacka (SE); Josefin Karlsson, Torslanda (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/103,691

(22) PCT Filed: May 13, 2016

(86) PCT No.: PCT/EP2016/060817
§ 371 (c)(1),
(2) Date: Jun. 10, 2016

(87) PCT Pub. No.: WO2016/180961
PCT Pub. Date: Nov. 17, 2016

(65) Prior Publication Data
US 2017/0118667 A1 Apr. 27, 2017

Related U.S. Application Data

(60) Provisional application No. 62/161,486, filed on May 14, 2015.

(51) Int. Cl.
*H04W 24/10* (2009.01)
*H04W 4/24* (2018.01)
(Continued)

(52) U.S. Cl.
CPC .............. *H04W 4/38* (2018.02); *H04W 4/24* (2013.01); *H04W 8/04* (2013.01); *H04W 8/08* (2013.01);
(Continued)

(58) Field of Classification Search
CPC ..... H04W 24/10; H04W 84/042; H04W 4/24; H04W 4/02; H04W 8/04; H04W 60/00;
(Continued)

(56) References Cited

U.S. PATENT DOCUMENTS 9,055,407 B1 * 6/2015 Riemer ............. H04M 1/72569
9,137,652 B2 * 9/2015 Zhou ..................... H04M 15/00
(Continued)

FOREIGN PATENT DOCUMENTS

WO 2014051260 A1 4/2014

OTHER PUBLICATIONS

Ericsson "Monitoring for roaming scenarios" SA WG2 Meeting #110, S2-152500, 2015, 10 pages.
(Continued)

*Primary Examiner* — Meless N Zewdu
(74) *Attorney, Agent, or Firm* — Rothwell, Figg, Ernst & Manbeck, P.C.

(57) ABSTRACT

Embodiments herein relate to systems and methods for providing monitoring services comprising receiving, at an aggregator proxy function, APF in a first Public Land Mobile Network, PLMN, a first event report transmitted by a monitoring function in the first PLMN. The first event report comprising first event information related to a monitoring event, and a request identifier. Further, receiving, at the APF, a second event report transmitted by a monitoring function in the first PLMN. The second event report comprising second event information related to the monitoring event, and said request identifier. After receiving the first and second event reports, the APF transmitting an aggregate event report to a report receiving function not in the first PLMN.

25 Claims, 5 Drawing Sheets

(51) Int. Cl.
| | |
|---|---|
| *H04W 4/38* | (2018.01) |
| *H04W 8/04* | (2009.01) |
| *H04W 8/10* | (2009.01) |
| *H04W 8/08* | (2009.01) |
| *H04W 8/12* | (2009.01) |
| *H04W 24/02* | (2009.01) |
| *H04W 64/00* | (2009.01) |
| *H04W 4/70* | (2018.01) |
| *H04W 4/029* | (2018.01) |
| *H04W 8/18* | (2009.01) |
| *H04W 88/08* | (2009.01) |
| *H04W 88/02* | (2009.01) |
| *H04W 88/00* | (2009.01) |
| *H04W 84/04* | (2009.01) |

(52) U.S. Cl.
CPC ............... *H04W 8/10* (2013.01); *H04W 8/12* (2013.01); *H04W 24/02* (2013.01); *H04W 24/10* (2013.01); *H04W 64/00* (2013.01); *H04T 2001/103* (2013.01); *H04T 2001/215* (2013.01); *H04W 4/029* (2018.02); *H04W 4/70* (2018.02); *H04W 8/18* (2013.01); *H04W 84/042* (2013.01); *H04W 88/00* (2013.01); *H04W 88/02* (2013.01); *H04W 88/08* (2013.01)

(58) Field of Classification Search
CPC ......... H04W 60/04; H04W 8/02; H04W 8/08; H04W 4/70; H04W 4/029; H04W 4/38; H04W 8/10; H04W 8/12; H04W 8/14; H04W 8/18; H04W 8/22; H04W 8/24; H04W 24/02; H04W 64/00; H04W 84/22; H04W 88/00; H04W 88/02; H04W 88/08; H04M 15/8038; H04M 2215/34; H04M 2215/7442; H04M 15/8278; G06F 11/3065; G06F 11/3072; G06F 5/10; G06F 9/4451; H04T 2001/103; H04T 2001/215
See application file for complete search history.

(56) References Cited

U.S. PATENT DOCUMENTS

| | | | |
|---|---|---|---|
| 2008/0293409 A1 | 11/2008 | Gillot et al. | |
| 2009/0135836 A1* | 5/2009 | Veillette | G01D 4/004 370/400 |
| 2009/0196225 A1* | 8/2009 | Avila Gonzalez | H04L 47/10 370/328 |
| 2012/0209978 A1* | 8/2012 | Cho | H04W 60/04 709/223 |
| 2013/0208661 A1* | 8/2013 | Nylander | H04W 48/17 370/328 |
| 2014/0047108 A1* | 2/2014 | Tse | H04L 43/06 709/224 |
| 2014/0073356 A1 | 3/2014 | Siomina et al. | |
| 2014/0134996 A1* | 5/2014 | Barclay et al. | 455/422.1 |
| 2014/0179310 A1* | 6/2014 | Liang | H04W 8/04 455/433 |
| 2014/0293824 A1 | 10/2014 | Castro Castro et al. | |
| 2015/0249900 A1* | 9/2015 | Kim | H04W 24/10 370/252 |
| 2016/0277243 A1* | 9/2016 | Kim | H04W 24/08 |
| 2018/0035313 A1* | 2/2018 | Wu | H04W 24/02 |

OTHER PUBLICATIONS

Ericsson et al. "Enhancing roaming architecture for Service Exposure" SA WG2 Meeting #109, S2-152125, 2015, 8 pages.
Cisco "Introduction of Charging Principles for Monitoring Events feature" SA WG2 Meeting #109, S2-152036, 2015, 3 pages.
Huawei et al., "Introduction of Monitoring Procedures," S2-151218 (revision of S2-150875), SA WG2 Meeting #108, Apr. 13-17, 2015, 12 pages.
International Search Report and Written Opinion issued in corresponding International application No. PCT/EP2016/060817, dated Aug. 10, 2016, 13 pages.

* cited by examiner

SYSTEM AND METHODS FOR MONITORING EVENTS ASSOCIATED WITH SERVICES OF MOBILE DEVICES

CROSS REFERENCE TO RELATED APPLICATION(S)

This application is a 35 U.S.C. § 371 National Phase Entry Application from PCT/EP2016/060817, filed May 13, 2016, designating the United States, and also claims the benefit of U.S. Provisional Application No. 62/161,486, filed May 14, 2015. The disclosures of both applications are incorporated herein in their entirety by reference.

TECHNICAL FIELD

Embodiments herein relates to systems and methods for providing monitoring services.

BACKGROUND

It is generally desirable to include in a network a capability for event monitoring. That is, one or more monitoring nodes in a network (i.e., a node (virtual or real) that implements a monitoring function) should be able to detect and reports events (including location).

As an example, a trusted third party may have a desire to monitor the location of a particular communication device (e.g., a smartphone phone, a machine type communications (MTC) device, etc.). Accordingly, an application operated by the third-party may send a request to a node in the communication device's home network to initiate the location monitoring of the communication device. This node, after authenticating the third party server, may then send instructions to other nodes within the communication device's home network to detect and report changes in the communication device's location. Such monitoring may be difficult, however, when the communication device is not connected to its home network, but is roaming.

What is desired, therefore, is a new and improved systems and methods for detecting and reporting events.

SUMMARY

An objective of the embodiments herein is therefore to provide improved systems and methods for detecting and reporting events.

According to a first aspect of the embodiments herein, a method for providing a monitoring service is provided. The method comprises receiving, at an aggregator proxy function (APF) in a first Public Land Mobile Network (PLMN), a first event report transmitted by a monitoring function in the first PLMN. The first event report comprising: 1) first event information related to a monitoring event and 2) a request identifier. Further, receiving, at the APF, a second event report transmitted by a monitoring function in the first PLMN. The second event report comprising: 1) second event information related to the monitoring event and 2) said request identifier. After receiving the first and second event reports, the APF transmitting an aggregate event report to a report receiving function not in the first PLMN. Such a report receiving function may be e.g. an SCEF implemented in a in a second PLMN that is separate and distinct from the first PLMN or at an external business partner. The aggregate event report comprises 1) at least one of the first event information and the second event information and 2) said request identifier.

The method may further comprise prior to receiving the first and second event reports, receiving at the APF a request message comprising the request identifier and information specifying a monitoring event; and after receiving the request message, transmitting a message to a monitoring function (e.g., a node implementing a monitoring function), the message comprising the request identifier and the information specifying the monitoring event.

In embodiments, the report receiving function may be a Service Capability Exposure Function (SCEF) and/or a Home Subscriber Server (HSS) function.

In embodiments, the first event report may be transmitted by a first monitoring function and the second event report is transmitted by a second monitoring function that could be separate and distinct from the first monitoring function.

In embodiments, the first monitoring function may be one of: i) an MME, ii) an SGSN, iii) a PDN-GW, iv) a PCRF, v) SGW, vi) RCAF, vii) eNB, viii) RNC, and ix) BSC, and the second monitoring function may be one of: i) an MME, ii) an SGSN, iii) a PDN-GW, iv) a PCRF, v) SGW, vi) RCAF, vii) eNB, viii) RNC, and ix) BSC.

In embodiments, the first event report may comprise information specifying a reporting event.

In embodiments, the request message may comprise information specifying a reporting event.

In embodiments, the APF may detect the occurrence of the specified reporting event, and the APF transmits to the report receiving function an aggregate event report as a result of detecting the occurrence of the specified reporting event. The receiving function may be in form of e.g., SCEF, HSS, etc.

In embodiments, the information specifying the reporting event may comprise a value representing a number of event reports, and the APF may detect the occurrence of the specified reporting event by comparing said value with a value identifying a number of event reports comprising the request identifier that have been received by the APF.

In embodiments, the information specifying the reporting event may comprise a value representing an amount of time, and the APF may detect the occurrence of the specified reporting event by comparing said value with a value identifying an elapsed amount of time.

In embodiments, the information specifying the reporting event may comprise a value representing a number of reports to be sent from the APF, and the APF may detect the occurrence of the specified reporting event and decrease by one each time from the said number.

In embodiments, the method may further comprise the APF generating charging information.

In embodiments, the method may further comprise the APF receiving a permission request from a monitoring function; the APF, in response to the permission request, transmitting a permission response to the monitoring function; and the monitoring function, after receiving the permission response, transmitting an event report to the APF.

In embodiments, the request identifier may comprise an address of the report receiving function.

In embodiments, the request identifier may further comprise an element that is separate and distinct from the address of the reporting function.

In embodiments, the first event report may further comprise an address of the report receiving function.

The embodiments herein relate further to an aggregator proxy function (APF) configured to perform the method above.

Further the embodiments herein relate to a corresponding method in a monitoring function and a monitoring function node.

Some advantages of the embodiments herein are found below.

Introducing an APF in the first PLMN is advantageous, since it allows trusted and secure communication between either two operators (ordinary roaming), within an operator, or between an operator and an external third party. The APF may be seen as a light weight aggregation point allowing for the (visited) operator network to make appropriate decisions towards an APF in the second PLMN and the requests of the second APF, which is advantageous since business decisions may be taken in an appropriate and secure way. Such APF in the first and second PLMN, respectively, may be seen as two functions on the same level in the architecture, which two functions communicate with each other, and therefore simplifies agreements for possible future features.

Since the APF in the first PLMN is responsible for authorization of the APF in the second PLMN and the incoming requests, the APF in the first PLMN allows for simplified secure communication with a third party APF in a second PLMN. The APF in the first PLMN may aggregate all responses and transmit a single response to the request to a report receiving function not in the first PLMN, which may be e.g. an SCEF implemented in a in a second PLMN.

Still an advantage is that the APF in the first PLMN have an interface to one point in the second PLMN, the APF in the second PLMN. Thus, no underlying nodes in the first PLMN need to be revealed at the second PLMN.

Since the APF in the first PLMN is responsible for configuration of its own underlying functions, such as the a mobility management node, MMN, the configuration is not dependent of possible operator specific features or implementations. Further, it allows for implementation of operator specific implementations in the first PLMN without having an impact on the second PLMN.

An additional advantage with the embodiments herein is that the embodiments herein allow for charging data records, for instance in form of a Charging Data Record, CDR, being generated by one functional entity in the first PLMN, namely the APF in the first PLMN, instead of the underlying functions in the first PLMN such as the MMN. Optionally, charging reports may be generated in underlying functions, as optional, and operator specific charging reports.

DETAILED DESCRIPTION

Figure 1:
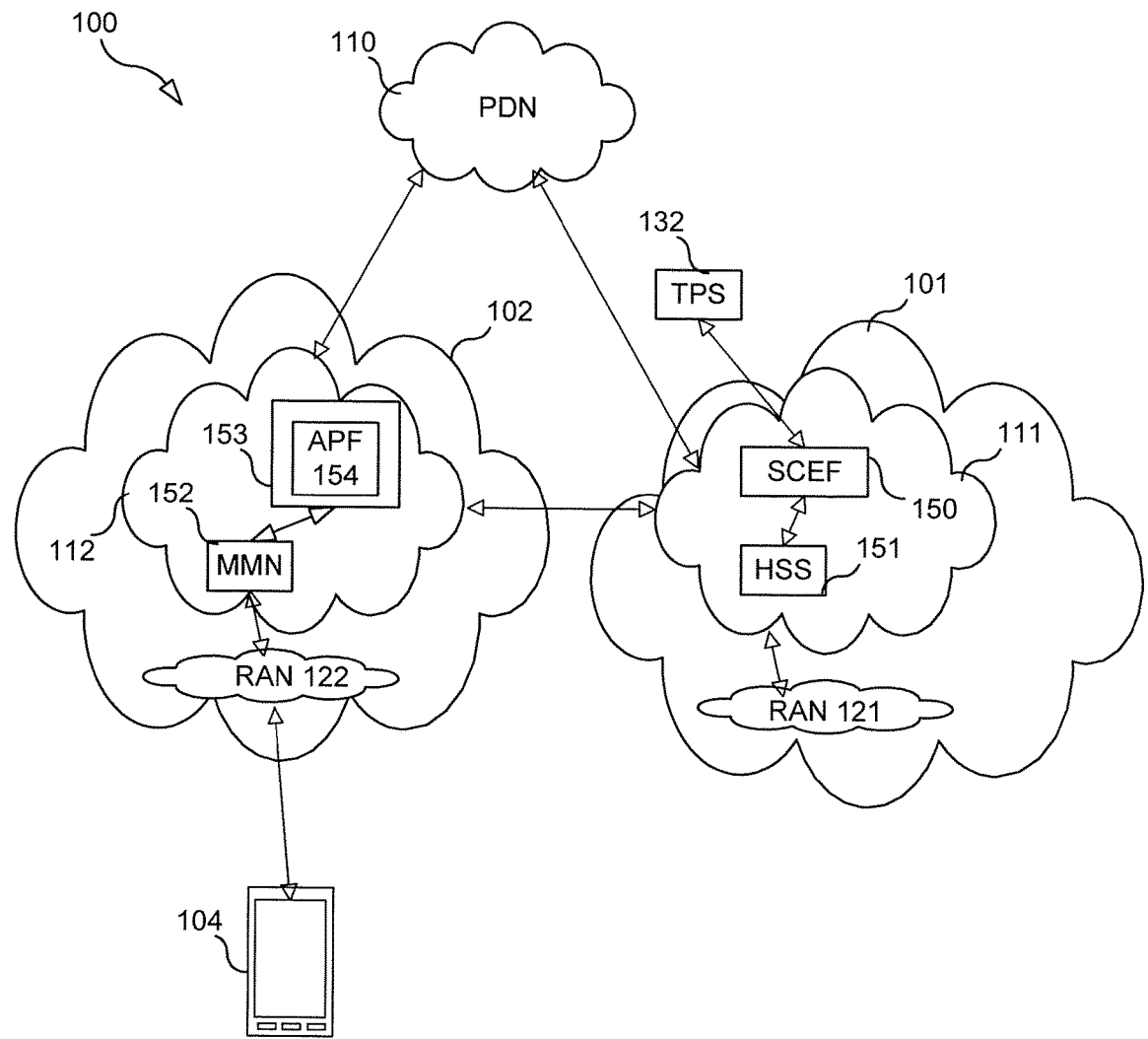
FIG. 1 illustrates a communication system.

FIG. 1 illustrates a communication system 100 according to some embodiments. The communication system 100 includes a first Public Land Mobile Network (PLMN) 102 that includes a core network 112 and a second PLMN 101 that includes a core network 111. In the example shown, PLMN 101 also includes a radio access network (RAN) 121 and PLMN 102 includes a RAN 122. Also shown is a wireless communication device (WCD) 104 (sometimes also referred to as user equipment (UE) 104), and a third-party server (TPS) 132 (e.g., an application server or an SCS). WCD 104 can use either PLMN 101 or PLMN 102 to access a packet data network 110, such as the Internet. WCD 104 can be a mobile communication device (e.g., a smartphone) or a generally non-mobile communication device (e.g., an MTC device, such as a sensor). The third party operating TPS 132 may desire to monitor WCD 104 (e.g., monitor the location of WCD 104 or monitor some other facet of WCD 104).

Figure 2:
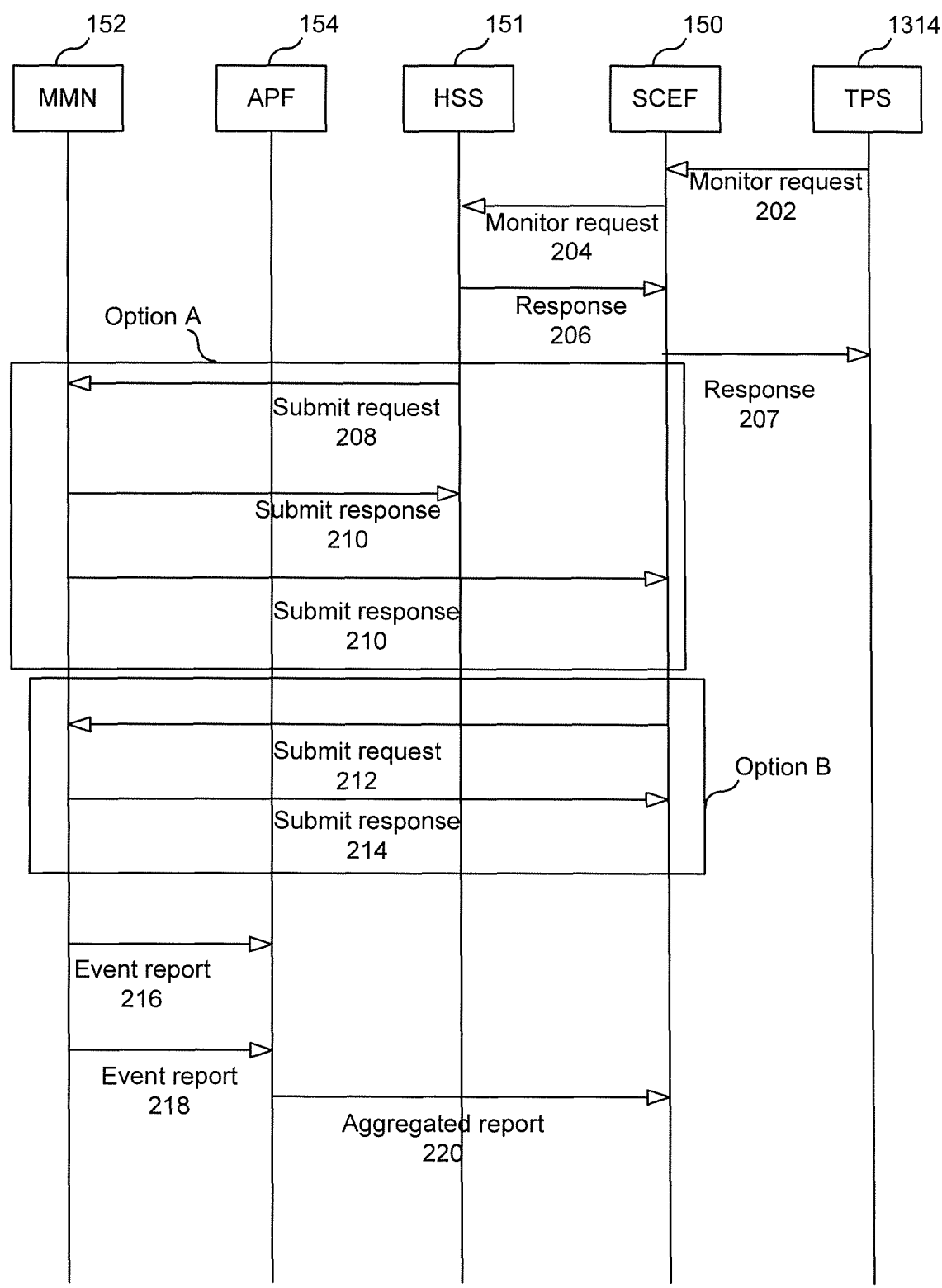
FIG. 2 is a message flow diagram according to one embodiment.

Referring now to FIG. 2, FIG. 2 is a message flow diagram illustrating one alternative embodiment.

As shown in FIG. 2, TPS 132 transmits a monitoring request 202 to a Service Capability Exposure Function (SCEF). In this example the monitoring request 202 is sent to SCEF 150 in the WCD's home PLMN, which in this example we will assume is PLMN 101. While SCEF 150 is shown as being a part of PLMN 101, this is not a requirement, in some embodiments SCEF 150 is not part of either PLMN 101 or PLMN 102. The monitoring request 202 includes event configuration information for a particular monitoring event. The event configuration information may include an event type identifier for identifying an event type (e.g., "Loss of Connectivity", "UE Reachability", "Location Reporting", "Roaming Status," etc.) and parameters associated with the identified event type (e.g., a WCD identifier for identifying a WCD), Monitoring Event Priority, Monitoring Destination node etc. As used herein, the term "node" encompasses virtual nodes and non-virtual nodes.

The SCEF 150, in some embodiments, checks that the TPS 132 is authorized to send monitoring requests and that the TPS has not exceeded its quota or rate of submitting monitoring requests. If this check fails the SCEF sends a Monitoring Response message with a cause value indicating the reason for the failure condition and the flow stops at this step. If this check does not fail, the SCEF 150 sends a Monitoring Request message 204 to a home subscriber server (HSS). In this example the HSS is HSS 151 in PLMN 101. Monitoring Request message 204 includes the event configuration information (e.g., event type identifier and associated parameters). The SCEF 150 may store some or all of the event configuration information.

The HSS 151 verifies the event configuration information. In some embodiments, monitoring events are configured in HSS as part of UE subscriber data.

The HSS 151 sends a Monitoring Response 206 to the SCEF 150 when accepting the Monitoring Request. In some embodiments, response 206 includes the address(es) of one or more monitoring node(s) (a.k.a., "serving nodes"). A "monitoring node" is a node that implements a monitoring function.

As a result of receiving response 206, the SCEF sends a response 207 to the TPS. If the cause value from HSS indicates the TPS is not allowed monitor this event or the identified UE, or there is no valid subscription information a confirm message is sent with a cause value indicating the reason for the failure condition and the flow stops at this step.

Option A

In some embodiments, based on the type of event configuration requested by TPS (e.g., based on the event configuration information received by the HSS), the HSS determines the monitoring node(s) (e.g., a mobility management node (MMN), such as, for example a Mobility Management Entity (MME) and a Serving GPRS Support Node (SGSN))

for the monitoring event and sends a submit request 208 to the determined monitoring nodes. For example in case of monitoring event configuration at an MMN, the HSS sends submit request message 208 to the MMN. The identified WCD may be registered with two MMNs (e.g., an MME and an SGSN), which requires sending Submit Request 208 to both nodes. In the example shown, submit request 208 is sent to MMN 152 in PLMN 102. While this disclosure uses an MMN as an exemplary monitoring nodes, other nodes of a PLMN may be used as monitoring nodes, such as, but not limited to: a gateway (e.g., a packet data network gateway (PDN-GW), a node that implements a Policy and Charging Rules Function (PCRF), a Serving Gateway (SGW), a node that implements a Radio Access Network Congestion Awareness Function (RCAF), an evolved NodeB (eNB), a Radio Network Controller (RNC), and a Base Station Controller (BSC).

The Submit Request 208 contains monitoring event data, which includes a request identifier and information about the event (or events) that the MMN is being asked to monitor (e.g., the event type identifier and/or associated parameters). The submit request 208 will also include the target address for the event reports, e.g. the network address or domain name of the HSS 151 or SCEF 150, if such event report target address is not a component of the request identifier. If submit request 208 requests continuous reporting (as opposed to one-time reporting), then the submit request 208 may also include information identifying a maximum number of event reports that the MMN should send and/or information identifying a reporting interval. This information regarding the maximum number of event reports and reporting interval may come from the monitoring request message received at the HSS. The request identifier is an identifier uniquely associated with monitoring request 202/204 so that the request identifier identifies a specific transaction. In some embodiments, the request identifier is based on the target address for the event reports (e.g., the network address or domain name of SCEF 150). For example, in some embodiments the request identifier comprises a data element (e.g., character string) derived from the target address. In some embodiments, the request identifier comprises the target address. In such embodiments, the request identifier may further include one or more additional data elements that are separate and distinct from the target address, such as a data element generated or selected by the SCEF or HSS.

The MMN on receiving the Submit Request 208 configures the monitoring event by using the monitoring event data to generate a Monitoring configuration context. The MMN confirms the monitoring request submission by sending a submit response 210. The submit response 210 may be sent to HSS 151 and/or SCEF 150. The Monitoring configuration context is stored as part of the WCD context (a.k.a., UE context), if the monitoring event configuration is specific for a WCD. The target address for the event reports generated by the monitoring node(s) is stored by the MMN.

Option B

In some embodiments, SCEF 150 determines the monitoring node(s) for the monitoring event based on the information received from TPS and HSS 151 (or based on other information) and sends a submit request 212 to the determined monitoring nodes. For example in case of monitoring event configuration (or activation/deactivation) at MMN 152, SCEF 150 sends message 212 to the MMN. The WCD may be registered with both the MMN 152 and another MMN (e.g., an SGSN), which requires sending the submit request 212 to both MMNs.

The Submit Request 212 contains monitoring event data, which includes a request identifier and information about the event (or events) that the MMN is being asked to monitor (e.g., the event type identifier and/or associated parameters). The submit request 208 will also include the target address for the event reports, e.g. the HSS or the SCEF address, if such event report target address is not a component of the request identifier. If submit request 212 requests continuous reporting (as opposed to one-time reporting), then the submit request 212 may also include information identifying a maximum number of event reports that the MMN should send and/or information identifying a reporting interval. This information regarding the maximum number of event reports and reporting interval may come from the monitoring request message received at the HSS. The request identifier is an identifier uniquely associated with monitoring request 202/204 so that the request identifier identifies a specific transaction. In some embodiments, the request identifier is based on the target address for the event reports. In some embodiments, the request identifier comprises the target address. In such embodiments, the request identifier may further include one or more additional data elements that are separate and distinct from the target address, such as a data element generated or selected by the SCEF or HSS.

The MMN on receiving submit request 212 configures the monitoring event by using the monitoring event data to generate a Monitoring configuration context. The MMN confirms the monitoring request submission by sending to SCEF 150 a submit response 214. The Monitoring configuration context is stored as part of WCD context, if the monitoring event configuration is specific for a WCD. The target address for the event reports generated by the monitoring node(s) is stored by the MMN.

In both options A and B, the Monitoring configuration context is exchanged between MMNs during mobility procedure (e.g. HO/TAU/RAU), so that the target MMN can be aware of the Monitoring event trigged by the MM procedure and perform corresponding actions e.g. reporting Monitoring event.

At this point, the MMN 152 is configured for monitoring a particular event. That is, MMN 152 is configured for detecting occurrences of the event and sending event reports in response to an event detection.

FIG. 2 shows MMN 152 detecting a first event and sending a first event report 216 and then later detecting a second event and sending a second event report 218. As shown in FIG. 2, MMN 152 sends the event reports 216, 218 to an aggregator node 153 in PLMN 102 that comprises an aggregator proxy function 154. The address (e.g., network address or domain name) of node 153 may be predefined in a configuration of the MMN. If the MMN knows the domain name of node 153, it can obtain node 153's network address via a domain name server (DNS).

Aggregator proxy function 154 stores the event reports 216/218 received at node 153.

Event report 216 includes the request identifier that was included in the submit request 208/212. If the event report target address is not a component of the request identifier, then the event report target address is also included in the report 216. Similarly, event report 218 includes, at a minimum, the request identifier that was included in submit request 208/212. In some embodiments, if submit request 208/212 includes information identifying the maximum number of event reports and/or information identifying a reporting interval, then this information will also be included in at least one of event report 216 and event report 218.

Aggregator node 153 may continue receiving event reports from MMN 152 as well as from other MMNs. Because each of the event reports received at aggregator node 153 contains a request identifier, aggregator proxy function (APF) 154 is able to combine event information from all reports containing the same request identifier into an aggregated report. Thus, each aggregated report is associated with a particular request identifier. In some embodiments, each such aggregated report only contains event information from event reports that have the same request identifier. After generating an aggregated report, APF 154 transmits the aggregated report to the target address associated with the request identifier associated with the aggregated report. For example, FIG. 2 shows APF 154 sending an aggregated report 220 to SCEF 150. In this example, aggregated report 220 includes: event information extracted from event report 216, event information extracted from report 218, and the request identifier that was included in event report 216.

In cases where the submit request 208/212 includes the information identifying a maximum number of event reports, APF 154 may be configured such that it sends an aggregated report associated with the request identifier included in the submit request at the time that the APF 154 has received a number of event reports that is equal to the identified a maximum number of event reports. Thus, APF 154 compares the number of received event reports associated with a particular request identifier with the specified maximum number of event reports. Similarly, in cases where the submit request 208/212 includes the information identifying a reporting interval, APF 154 may be configured such that it sends aggregated reports associated with the request identifier included in the submit request in accordance with the identified reporting interval. For example, consider a case where a submit request includes a request identifier of ID1, a value of 3 representing the maximum number of reports and a value 10 representing a time interval of 10 minutes. In this situation, if APF 154 receives only two event reports containing identifier ID1 then APF 154 will send the aggregated report once 10 minutes has elapsed. On the other hand, in some embodiments, if APF 154 receives two such event reports and then receives a third event report with identifier ID1 within the 10 minute interval, then APF 154 will generate and send the aggregated report upon receiving the third report despite the fact that the 10 minutes interval has not elapsed.

In some embodiments, before APF 154 sends an aggregated report to a target address (e.g., SCEF 150), APF 154 first verifies that it is authorized to send the requested aggregated report to the target address.

In some embodiments, APF 154 generates charging information. For example, APF 154 may charge for each event report received and/or for each aggregated report sent.

In some embodiments, before MMN 152 sends any event reports to node 153, the MMN 152 sends to APF 154 a request seeking permission to send event reports to node 153. APF 154 can then authorize (or not authorize) the MMN 152 to send reports to node 153.

Figure 3:
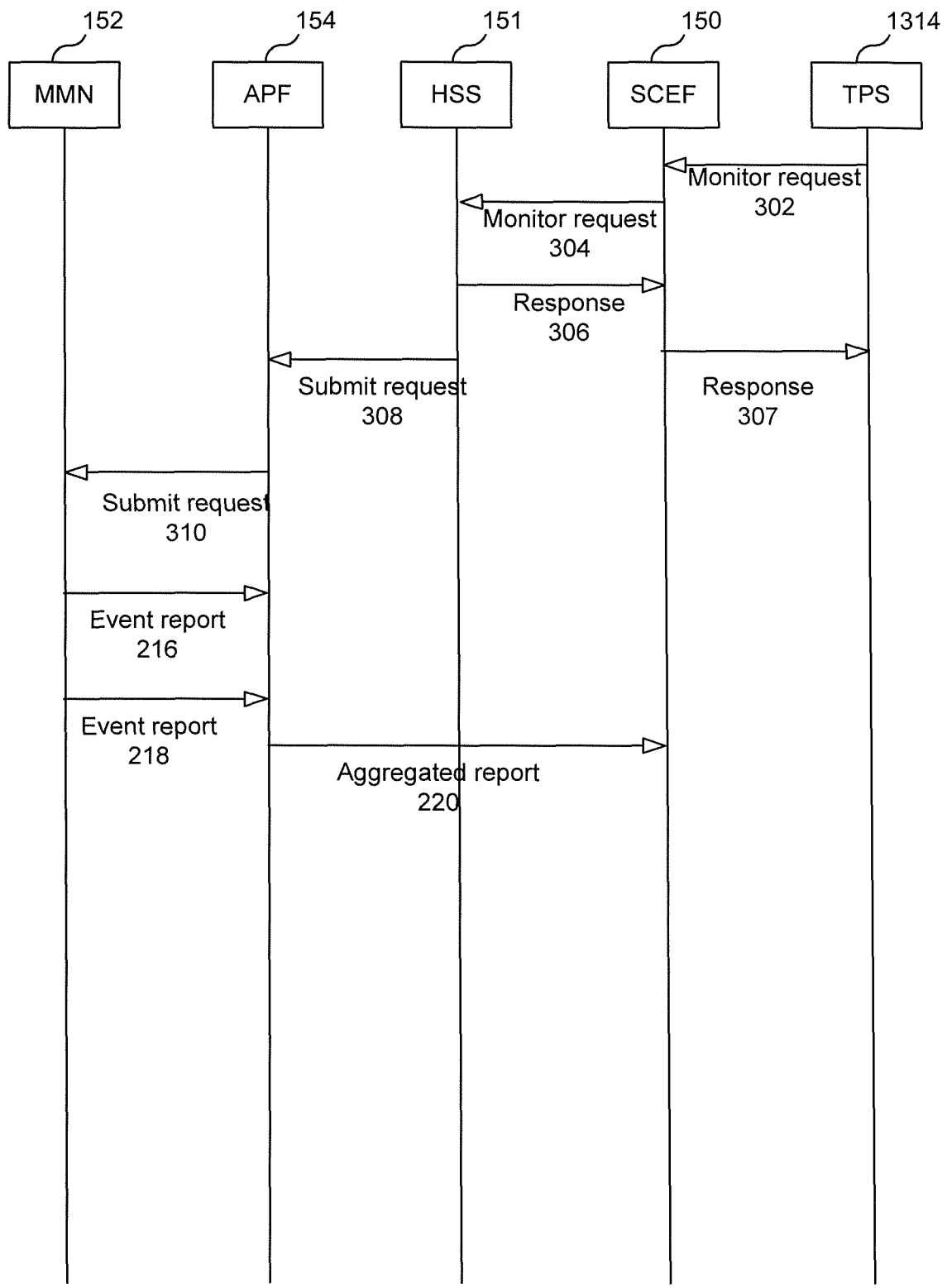
FIG. 3 is a message flow diagram according to one embodiment.

Referring now to FIG. 3, FIG. 3 is a message flow diagram illustrating another embodiment. As shown in FIG. 3, TPS 132 transmits a monitoring request 302 to SCEF 150. The monitoring request 302 includes event configuration information for a particular monitoring event. This event configuration information is described above.

The SCEF 150, in some embodiments, checks that the TPS 132 is authorized to send monitoring requests and that the TPS has not exceeded its quota or rate of submitting monitoring requests. If this check fails the SCEF sends a Monitoring Response message with a cause value. If this check does not fail, the SCEF 150 sends a Monitoring Request message 304 to HSS 151. Monitoring Request message 304 includes the event configuration information (e.g., event type ID, etc.). The HSS 151 verifies the monitoring event information. The HSS 151 sends a Monitoring Response 306 to the SCEF 150 when accepting the Monitoring Request. As a result of receiving response 306, the SCEF sends a response 307 to the TPS.

The HSS 151 also sends a submit request 308 to APF 154. The Submit Request 308 contains monitoring event data, which includes a request identifier and information about the event (or events) that the MMN is being asked to monitor (e.g., the event type identifier and/or associated parameters). Submit Request 308 may also contain the target address for the event reports, e.g. the HSS or the SCEF. If submit request 308 requests continuous reporting (as opposed to one-time reporting), then the monitoring event data included in the submit request 308 may also include information identifying a maximum number of event reports that the MMN should send and/or information identifying a reporting interval. This information regarding the maximum number of event reports and reporting interval may come from the monitoring request message received at the HSS. The request identifier is an identifier uniquely associated with monitoring request 302/304 so that the request identifier identifies a specific transaction. In some embodiments, the request identifier is based on the target address for the event reports. In some embodiments, the request identifier comprises the target address. In such embodiments, the request identifier may further include one or more additional data elements that are separate and distinct from the target address, such as a data element generated or selected by the SCEF or HSS.

APF 154 receives the submit request 308 and then determines whether HSS 151 is authorized to send submit request 308 to APF 154. If it is not authorized, APF 154 sends a response indicating a failure.

If the HSS 151 is authorized, then APF 154 determines the monitoring node(s) for the monitoring event based on the request 308 received from HSS 151 (or based on other information) and sends a submit request 310 to the determined monitoring nodes. Submit request 310 includes the monitoring event data included in request 308. For example in case of monitoring event configuration (or activation/deactivation) at MMN 152, APF 154 sends message 310 to the MMN 152.

The MMN on receiving the Submit Request 310 configures the monitoring event by using the monitoring event data to generate a Monitoring configuration context. The Monitoring configuration context is stored as part of the WCD context, if the monitoring event configuration is specific for a WCD. The MMN now begins event monitoring and, as described above, sends event reports to APF 154. APF 154 aggregates the event reports and generates charging information as described above with respect to FIG. 2.

Figure 4:
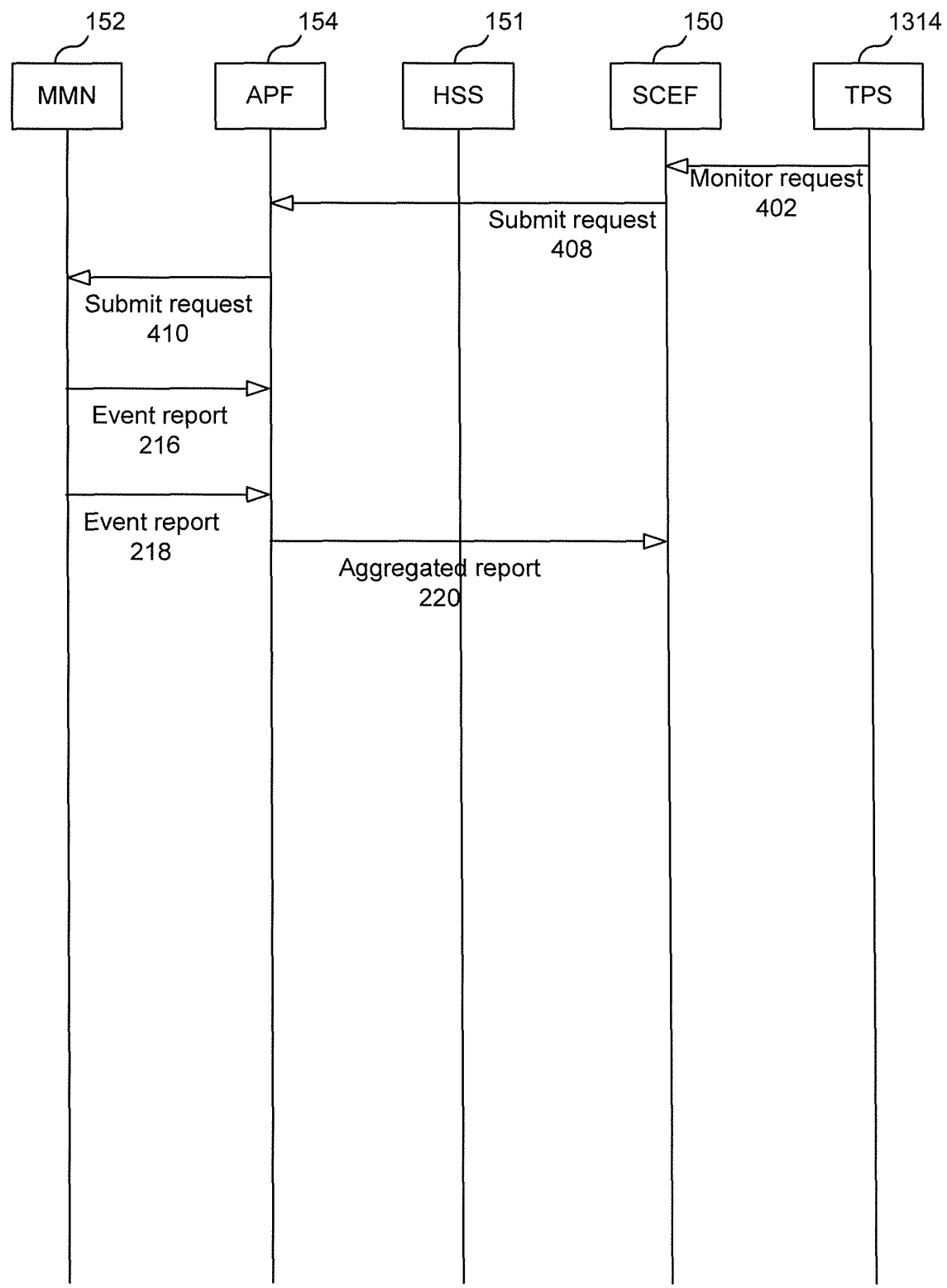
FIG. 4 is a message flow diagram according to one embodiment.

Referring now to FIG. 4, FIG. 4 is a message flow diagram illustrating another embodiment. As shown in FIG. 4, TPS 132 transmits a monitoring request 402 to SCEF 150. The monitoring request 402 includes event configuration information for a particular monitoring event. This event configuration information is described above.

The SCEF 150, in some embodiments, checks that the TPS 132 is authorized to send monitoring requests and that the TPS has not exceeded its quota or rate of submitting monitoring requests. If this check fails the SCEF sends a Monitoring Response message with a cause value.

If this check does not fail, the SCEF 150 sends a submit request 408 to APF 154. The Submit Request 408 contains monitoring event data, which includes a request identifier and information about the event (or events) that the MMN is being asked to monitor (e.g., the event type identifier and/or associated parameters). Submit Request 408 may also contain the target address for the event reports, e.g. the HSS or the SCEF. If submit request 408 requests continuous reporting (as opposed to one-time reporting), then the monitoring event data included in the submit request 408 may also include information identifying a maximum number of event reports that the MMN should send and/or information identifying a reporting interval. This information regarding the maximum number of event reports and reporting interval may come from the monitoring request message received at the SCEF 150. The request identifier is an identifier uniquely associated with monitoring request 402 so that the request identifier identifies a specific transaction. In some embodiments, the request identifier is based on the target address for the event reports. In some embodiments, the request identifier comprises the target address. In such embodiments, the request identifier may further include one or more additional data elements that are separate and distinct from the target address, such as a data element generated or selected by the SCEF.

APF 154 receives the submit request 408 and then determines whether SCEF 150 is authorized to send submit request 408 to APF 154. If it is not authorized, APF 154 sends a response indicating a failure.

If the SCEF 150 is authorized, then APF 154 determines the monitoring node(s) for the monitoring event based on the request 408 received from SCEF 150 (or based on other information) and sends a submit request 410 to the determined monitoring nodes (in this case MMN 153). Submit request 410 includes the monitoring event data included in request 408.

The MMN 152 on receiving the Submit Request 410 configures the monitoring event by using the monitoring event data to generate a Monitoring configuration context. The MMN confirms the monitoring request submission by sending a submit response 412. The Monitoring configuration context is stored as part of the WCD context, if the monitoring event configuration is specific for a WCD. The MMN now begins event monitoring and, as described above, sends event reports to APF 154. APF 154 aggregates the event reports and generates charging information as described above with respect to FIG. 2.

Figure 5:
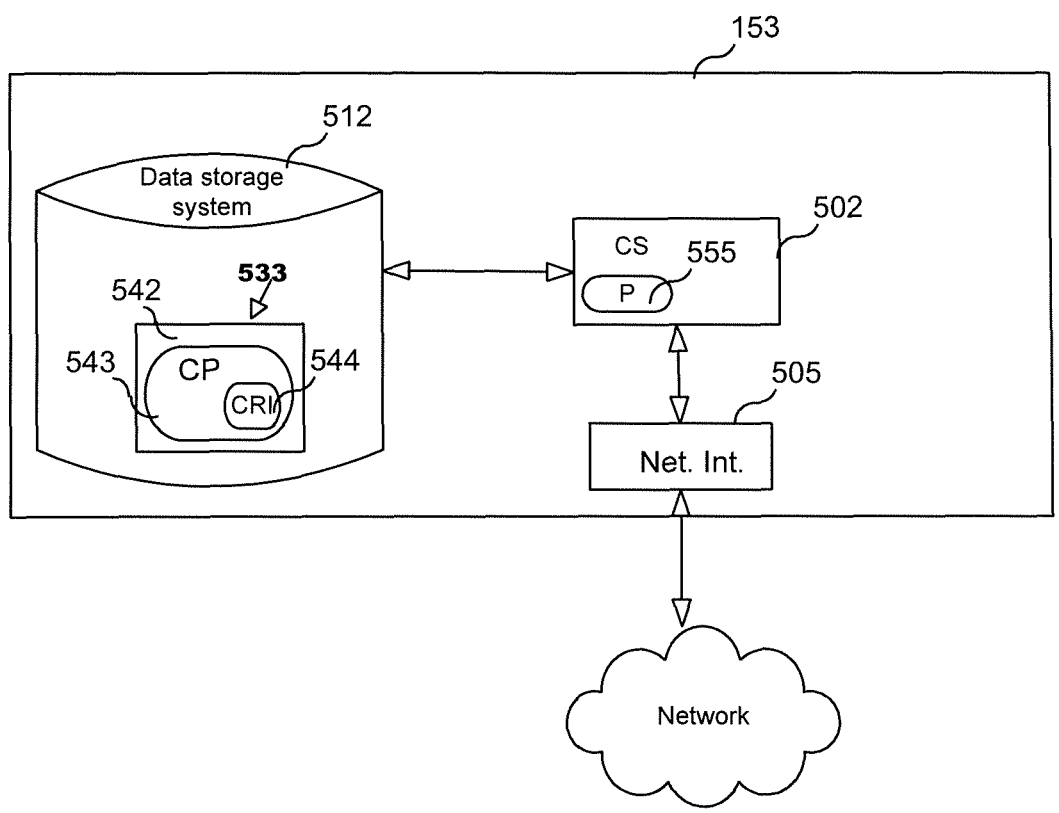
FIG. 5 is a functional block diagram of an aggregator node that implements an aggregating proxy function (APF) according to some embodiments.

FIG. 5 is a block diagram of aggregator node 153, according to some embodiments. As shown in FIG. 5, aggregator node 153 may include or consist of: a computer system (CS) 502, which may include one or more processors (P) 555 (e.g., a microprocessor) and/or one or more circuits, such as an application specific integrated circuit (ASIC), field-programmable gate arrays (FPGAs), a logic circuit, and the like; a network interface 505 for connecting aggregator node 153 to network 130; one or more RU interfaces 508 for connecting aggregator node 153 to a network; and a data storage system 512, which may include one or more non-volatile storage devices and/or one or more volatile storage devices (e.g., random access memory (RAM)). In some embodiments, network interface 505 includes a transceiver for transmitting data and receiving data.

In embodiments where aggregator node 153 includes a processor 555, a computer program product (CPP) 533 may be provided. CPP 533 includes or is a computer readable medium (CRM) 542 storing a computer program (CP) 543 comprising computer readable instructions (CRI) 544 for implementing APF 154 (e.g., instructions for performing steps described herein). CP 543 may include an operating system (OS) and/or application programs. CRM 542 may include a non-transitory computer readable medium, such as, but not limited to, magnetic media (e.g., a hard disk), optical media (e.g., a DVD), solid state devices (e.g., random access memory (RAM), flash memory), and the like.

In some embodiments, the CRI 544 of computer program 543 is configured such that when executed by computer system 502, the CRI causes the apparatus 55 to perform steps described above. In other embodiments, apparatus 55 may be configured to perform steps described herein without the need for a computer program. That is, for example, computer system 502 may consist merely of one or more ASICs. Hence, the features of the embodiments described herein may be implemented in hardware and/or software.

While various embodiments have been described above, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the invention unless otherwise indicated herein or otherwise clearly contradicted by context.

The invention claimed is:

1. A method in an aggregator proxy function (APF) for providing a monitoring service, the method comprising:
   the APF in a first Public Land Mobile Network (PLMN) receiving a first event report transmitted by a monitoring function in the first PLMN, the first event report comprising first event information related to a monitoring event, and a request identifier;
   the APF in the first PLMN receiving a second event report transmitted by the monitoring function in the first PLMN, the second event report comprising second event information related to the monitoring event, and said request identifier;
   after receiving the first and second event reports, the APF in the first PLMN creating an aggregate event report comprising: (i) at least one of the received first event information and the received second event information and (ii) said request identifier;
   the APF in the first PLMN transmitting the aggregate event report to a report receiving function not in the first PLMN, wherein the report receiving function not in the first PLMN is one of: a Service Capability Exposure Function (SCEF) and a Home Subscriber Server (HSS) function; and
   the APF in the first PLMN generating charging information based on the first event report, the second event report, and/or the aggregate event report.

2. The method of claim 1, further comprising:
   prior to receiving the first and second event reports, receiving a request message comprising the request identifier and information specifying the monitoring event; and
   transmitting the message to the monitoring function, the message comprising the request identifier and the information specifying the monitoring event.

3. The method of claim 1, wherein the first event report is transmitted by a first monitoring function and the second event report is transmitted by a second monitoring function that is separate and distinct from the first monitoring function.

4. The method of claim 3, wherein the first and second monitoring function, respectively, is one of: an Mobility Management Entity (MME), an Serving GPRS Support Node (SGSN), a Packet Data Network Gateway (PDN-GW), a Policy and Charging Rules Function (PCRF), a Serving Gateway (SGW), a Radio Access Network Congestion Awareness Function (RCAF), an evolved NodeB (eNB), a Radio Network Controller (RNC), and a Base Station Controller (BSC).

5. The method of claim 1, wherein the first event report comprises information specifying a reporting event, wherein the reporting event comprises the first event and the second event.

6. The method of claim 2, wherein the request message comprises information specifying a reporting event, wherein the reporting event comprises the first event and the second event.

7. The method of claim 5, wherein
the APF detects an occurrence of the specified reporting event, and
the APF transmits to the report receiving function the aggregate event report as a result of detecting the occurrence of the specified reporting event.

8. The method of claim 7, wherein
the information specifying the reporting event comprises a value representing a number of event reports, and
the APF detects the occurrence of the specified reporting event by comparing said value with a value identifying the number of event reports comprising the request identifier that have been received by the APF.

9. The method of claim 7, wherein
the information specifying the reporting event comprises a value representing an amount of time, and
the APF detects the occurrence of the specified reporting event by comparing said value with a value identifying an elapsed amount of time.

10. The method of claim 7, wherein
the information specifying the reporting event comprises a value representing a number of reports to be sent from the APF, and
the APF detects the occurrence of the specified reporting event and decrease by one each time from the said number.

11. The method of claim 1, further comprising:
the APF receiving a permission request from the monitoring function; and
the APF, in response to the permission request, transmitting a permission response to the monitoring function; and
the APF receiving the first and the second event reports from the monitoring function.

12. The method of claim 1, wherein the request identifier comprises an address of the report receiving function.

13. The method of claim 12, wherein the request identifier further comprises an element that is separate and distinct from the address of the reporting function.

14. The method of claim 1, wherein the first event report further comprises an address of the report receiving function.

15. An aggregator proxy function (APF) configured to perform the method of claim 1.

16. A method in a monitoring function for providing a monitoring service, the method comprising:
the monitoring function in a first Public Land Mobile Network (PLMN) transmitting a first event report to an aggregator proxy function (APF) in the first PLMN, the first event report comprising first event information related to a monitoring event and a request identifier; and
the monitoring function in the first PLMN transmitting a second event report to the APF in the first PLMN, the second event report comprising second event information related to the monitoring event and said request identifier,
wherein said request identifier comprises an address of a report receiving function not in the first PLMN,
wherein the APF in the first PLMN is configured to transmit an aggregate event report to the report receiving function not in the first PLMN,
wherein the APF in the first PLMN generates charging information based on the first event report, the second event report, and/or the aggregate event report, and
wherein the report receiving function not in the first PLMN is one of: a Service Capability Exposure Function (SCEF) and a Home Subscriber Server (HSS) function.

17. The method of claim 16, further comprising:
prior to transmitting the first and second event reports, receiving a request message comprising the request identifier and information specifying the monitoring event.

18. The method of claim 16, wherein the monitoring function is one of: Mobility Management Entity (MME), an Serving GPRS Support Node (SGSN), a Packet Data Network Gateway (PDN-GW), a Policy and Charging Rules Function (PCRF), a Serving Gateway (SGW), a Radio Access Network Congestion Awareness Function (RCAF), an evolved NodeB (eNB), a Radio Network Controller (RNC), and a Base Station Controller (BSC).

19. The method of claim 16, wherein the first event report comprises information specifying a reporting event, wherein the reporting event comprises the first event and the second event.

20. The method of claim 17, wherein the request message comprises information specifying a reporting event, wherein the reporting event comprises the first event and the second event.

21. The method of claim 20, wherein
the information specifying the reporting event comprises at least one of a value representing a number of event reports, a value representing an amount of time, or a value representing a number of reports to be sent from the APF.

22. The method of claim 16, further comprising:
the monitoring function transmitting a permission request to the APF;
the monitoring function receiving a permission response from the APF, in response to the permission request; and
the monitoring function transmitting the first and the second event reports to the APF.

23. The method of claim 16, wherein the request identifier further comprises an element that is separate and distinct from the address of the reporting function.

24. The method of claim 16, wherein the first event report further comprises the address of the report receiving function.

25. A monitoring function node configured to perform the method of claim 16.

* * * * *